United States Patent [19]

Satoh

[11] Patent Number: 4,551,769
[45] Date of Patent: Nov. 5, 1985

[54] PICTURE IMAGE PROCESSING MAGNETIC DISC CONTROLLING METHOD AND APPARATUS THEREFOR

[75] Inventor: Masato Satoh, Kanagawa, Japan

[73] Assignee: Fuji Xerox Co., Ltd., Tokyo, Japan

[21] Appl. No.: 447,363

[22] Filed: Dec. 6, 1982

[30] Foreign Application Priority Data

Dec. 7, 1981 [JP] Japan ................................. 56-195710

[51] Int. Cl.[4] .............................................. H04N 1/22
[52] U.S. Cl. ................................................... 358/296
[58] Field of Search ......................... 358/296, 301, 280

[56] References Cited

U.S. PATENT DOCUMENTS 4,205,350 5/1980 Gunning .............................. 358/296
4,245,247 1/1981 Fike et al. ........................ 358/296 X

FOREIGN PATENT DOCUMENTS 57-61372 4/1982 Japan .................................. 358/296

Primary Examiner—Thomas H. Tarcza

Attorney, Agent, or Firm—Sughrue, Mion, Zinn, Macpeak, and Seas

[57] ABSTRACT

A method and apparatus for controlling a plurality of magnetic discs for processing a composite picture image. The composite picture image is made up of a first picture image and a second picture image which is inserted into the first picture image. The first picture image is digitized and is stored in first predetermined positions on one track on one side or recording surface of a magnetic disc. The second picture image is digitized and stored in second predetermined positions between the first predetermined positions on the same track on another side or recording surface of the disc. Both sides or recording surfaces of the disc are read out, and a logic product is formed between the two stored signals therefrom. In another embodiment, the first picture image is OR'd processed with an image mask prior to combination with the second image signal. An apparatus to achieve the foregoing method includes a multiplexer code register for receiving an access code and controlling the actuation of the magnetic read-write heads accordingly.

9 Claims, 9 Drawing Figures

PICTURE IMAGE PROCESSING MAGNETIC DISC CONTROLLING METHOD AND APPARATUS THEREFOR

BACKGROUND OF THE INVENTION

The present invention relates to a method and apparatus for controlling magnetic discs which process a picture image.

As shown in FIG. 1, a first original document A has frames $A_1$–$A_6$ therein and a second original document B has information contents $B_1$ and $B_2$. In the case where the content $B_1$ is to be moved into each of the frames $A_1$, $A_3$ and $A_5$ and the content $B_2$ is to be moved into each of the frames $A_2$, $A_4$ and $A_6$, to obtain a merged document C (that is, when posting or moving is effected by a computer), the operation has been completed in a first manner in the prior art as described hereunder. It is assumed that a magnetic disc (hereinafter abbreviated as DK) is used as a storage means:

(1) the original document A is read by a picture image reading device and the read-out information is stored in an area A of a DK. The information stored in area A is referred to as "File A";

(2) the original document B is read by the picture image reading device and the read-out information is stored in an area B of the DK. The information stored in area B is referred to as "File B";

(3) picture information to be moved from File A is written into a main memory (hereinafter abbreviated as MM) from the DK. The picture information thus written into the MM is referred to as "Data A";

(4) picture information to be moved from File B is written into the MM from the DK. The picture information thus written into the MM is referred to as "Data B";

(5) data A and data B are ORed. The result of the ORing operation is referred to as "Data C";

(6) the Data C is read-out of the MM and stored in the DK. The stored data is referred to as "File C"; and (7) the File C is read-out to a picture image output device so that the original document C having a picture image if formed as shown in FIG. 1.

In the case where, for example, each of the original documents A, B and C of FIG. 1 is of "A4" size, and the picture image is read-out/written in with a resolution of about 10 lines/mm, the bulk of information will be as large as several megabites. This information corresponds to approximately 120 tracks of a DK.

When the above-mentioned steps (3) and (6) are executed, a track of disc DK in which File A has been stored (as well as the specific portion thereof which is to be moved) is first accessed to read picture information $a_1$ out of the File A into the MM. The track in which File B has been stored (as well as the specific portion thereof which is to be moved) is accessed to read picture information $b_1$ out of the File B into the MM. The information $a_1$ and $b_1$ are then ORed in the MM. The result of the OR operation is then read out of the MM and stored in the DK. Subsequently, another track in which File A is stored (along with the portion thereof to be transferred) is accessed to read out picture information $a_2$ of the File A into the MM, and another track in which File B is stored (along with the portion thereof to be transferred) is accessed to read out picture information $b_2$ of the File B into the MM. The information $a_2$ and $b_2$ are ORed in the MM and the result of OR operation is stored in the DK from the MM. Thus, in this first prior art processing method, the above-mentioned operations are repeatedly and cyclically effected approximately 120 times (in the above-mentioned example) before the transfer of an A4 size sheet of picture image of an original document can be completed.

As is apparent in the above-described conventional picture image transferring method, since the highest percentage of processing time is expended in accessing the DK, the processing time is unnecessarily long.

In the case where the picture image transferring processing is effected by using a masking step such as shown in FIG. 2, a mask B is placed over an original document A so as to delete picture image information in a portion of an original document A. A portion of picture image information on an original document C is moved to the portion of document A from which picture image information has been deleted to obtain an original document D. This second prior art processing method is effected by the following conventional steps:

(1′) the original document is read and the read-out information is stored at an area A of the DK. The stored information is referred to as "File A";

(2′) the original document is read and the read-out information is stored at area B of the DK. The stored information is referred to as "File B";

(3′) the mask B is read and the read-out information is stored at area C of the DK. The stored information is referred to as "File C";

(4′) the information from File A is read from the DK into the MM;

(5′) the picture information in a portion of the File C to be moved is read from the DK into the MM;

(6′) the information of the File B is read from the DK into the MM;

(7′) the respective images from File C, File B and File A are combined in the MM; and (8′) the information obtained by transferring a part of the original document C to a portion of the original document A is stored again in the DK.

The above-mentioned steps are repeated until the transfer of all the information to be moved has been completed. Thus, similarly to the previous processing method, the transfer process of moving a portion of the image on the original document C to a masked portion of the original document A unduly increases the processing time.

In both of the prior art image processing methods described above, the transfer processing time is unduly lengthy which decreases both the efficiency and utility of the image processing devices which effect these processing methods.

SUMMARY OF THE INVENTION

An object of the present invention is to provide an image processing method and apparatus in which the image processing time is minimized.

This and other objects of the invention are realized by an image processing method and apparatus in which the information bits are read in and are shifted and stored in different sides or recording surfaces of a storage disc so that they can be subsequently read out simultaneously. This greatly reduces the image processing time of the apparatus.

DETAILED DESCRIPTION OF THE PREFERRED EMBODIMENTS

Figure 3:
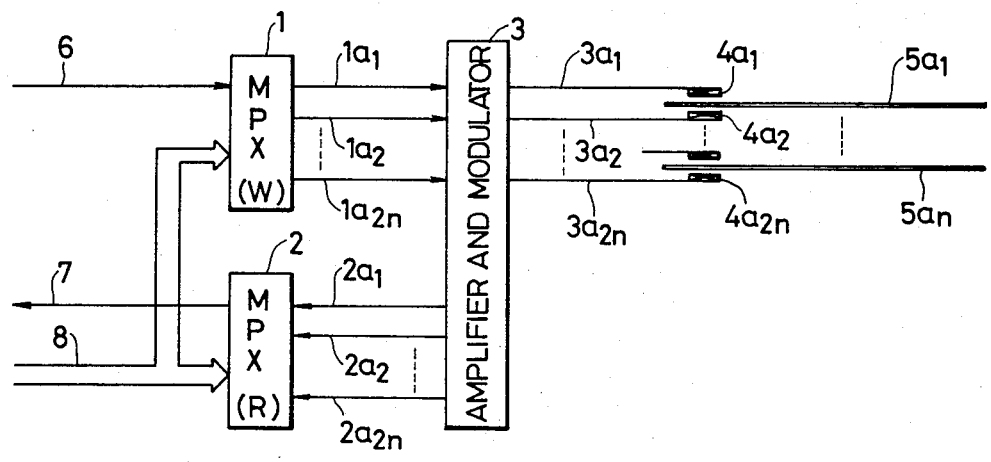
FIG. 3 is a block diagram of the first embodiment of the present invention.

In FIG. 3, reference numerals 1, 2 and 3 represent respectively a writing-head selector constituted by, for example, a multiplexer (hereinafter abbreviated as MPX), a reading-head selector constituted by an MPX, and an amplifier-decoder. The reference numerals $4a_1$–$4a_{zn}$ represent zn magnetic heads and numerals $5a_1$–$5a_n$ represent n disc boards (hereinafter referred to as DK boards). Each of the n disc boards are provided with information on its opposite surfaces by two of the magnetic heads $4a_1$–$4a_{2n}$. The reference numerals 6, 7 and 8 represent DK-write-in information, DK-read-out information and MPX code, respectively. The reference numerals $1a_1$ to $1a_{2n}$ represent lines for transmitting DK-write-in information produced from the writing-head selector 1, numerals $2a_1$–$2a_{2n}$ represent lines for transmitting DK-read-out information to be applied to the reading-head selector 2, and numerals $3a_1$–$3a_{2n}$ represent lines for either transmitting write-in information to be transferred to the magnetic heads $4a_1$ to $4a_{2n}$ or receiving read-out information from the DK boards $5a_1$–$5a_n$ via the magnetic heads $4a_1$–$4a_{zn}$.

Figure 4:
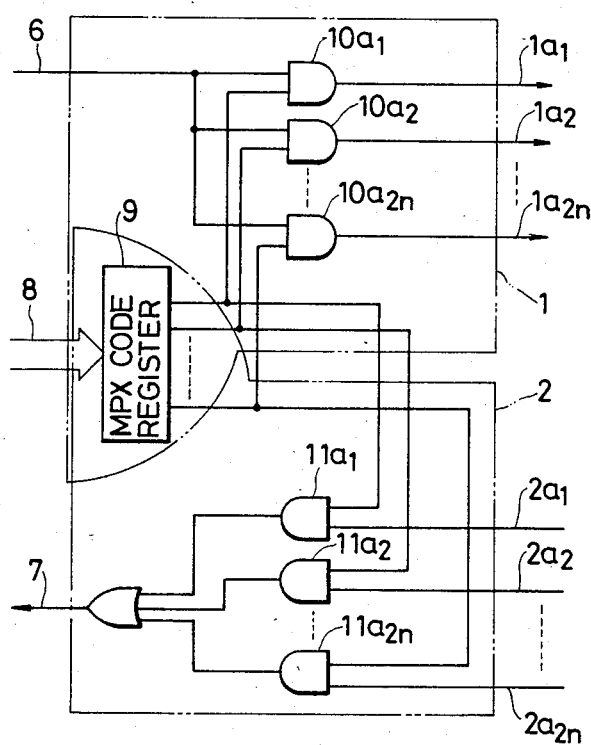
FIG. 4 is a circuit diagram of both the writing head and reading head selectors shown in FIG. 3.

FIG. 4 shows an embodiment of the writing-head selector 1 and the reading-head selector 2 as shown in FIG. 3. In FIG. 4, the reference numeral 9 designates an MPX code register.

Figure 1:
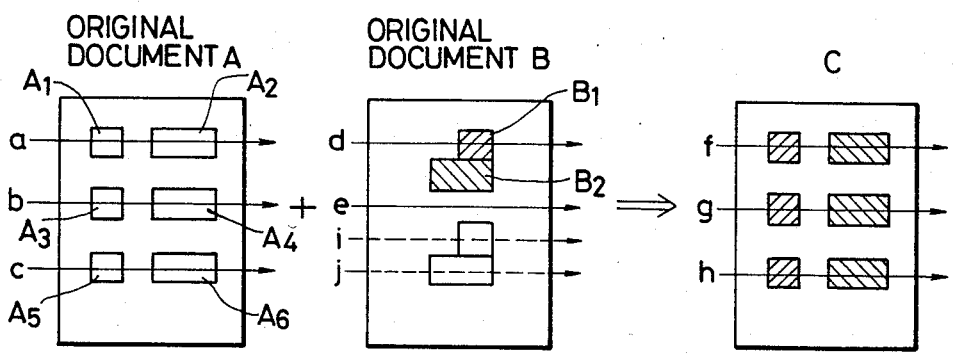
FIG. 1 is a diagram illustrating a first general example of posting processing.
Figure 5:
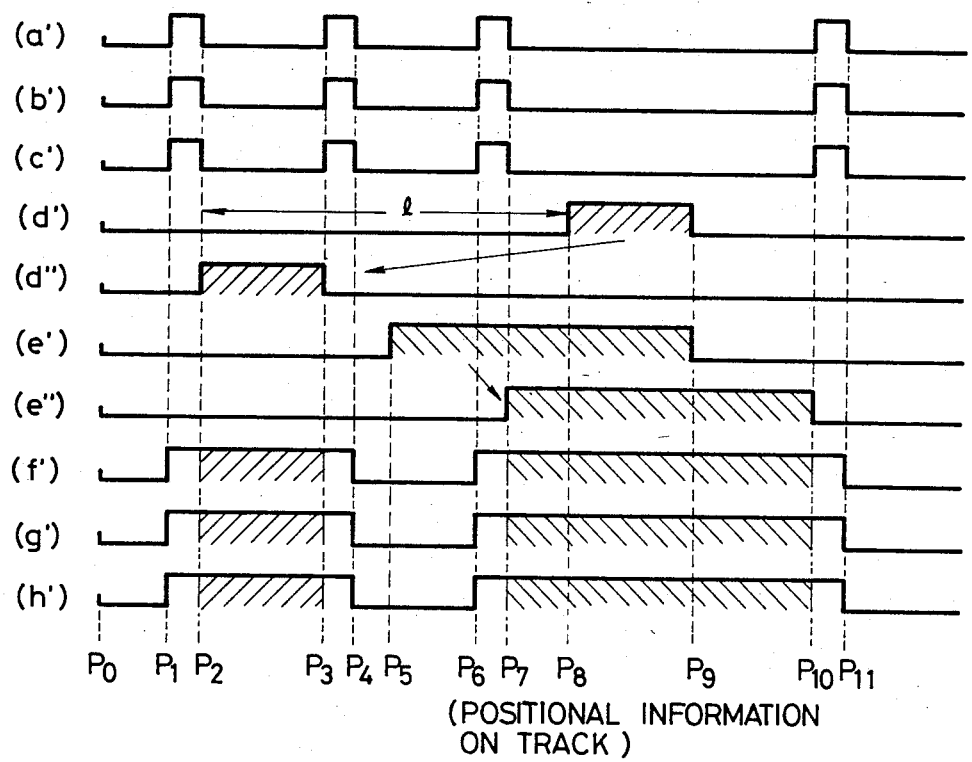
FIG. 5 is a time chart of picture image read-out signals for the first example as in FIG. 1 according to the first embodiment of the invention.

The operation of the above-mentioned embodiment of the present invention will now be described in which the contents of an original document B is moved to a portion of an original document A to obtain an original document C as shown in FIG. 1. FIG. 5 is a time chart of the picture image read-out of an original document (or, the picture image to be stored in a DK).

First, the original document A of FIG. 1 is scanned along the respective lines a, b and c in the transverse direction. The read-out signals are then subject to binary transformation to obtain binary signals a', b', and c' as shown in FIG. 5. At this time, the MPX code 8 of FIG. 4 is set to actuate the magnetic head $4a_1$ such that only an AND gate $10a_1$ of the writing-head selector 1 is opened, (the remainder AND gates $10a_2$–$10a_{2n}$ being in the closed condition). Thereafter, the binary information a', b', and c' is transferred to the first magnetic head $4a_1$ through the AND gate $10a_1$, lines $1a_1$ and $3a_1$, so that the first magnetic head $4a_1$ stores the binary information a', b' and c' at an address of a predetermined track on a surface of the DK board $5a_1$. The frame information for the binary information a', b' and c' is stored at positions $P_1$–$P_2$, $P_3$–$P_4$, $P_6$–$P_7$ and $P_{10}$–$P_{11}$ on the above-mentioned track.

To facilitate the further explanation of the operation of the invention, it is assumed that the amount of information read out by one scanning corresponds to the contents stored in one DK track. Although in actuality the amount of information read out by several tens of scanning operations corresponds to the contents stored in one DK track, it is possible to make this assumption via simple calculation. The signals a', b' and c' are allotted to the track addresses corresponding to the order of scanning; for example, the signals a', b' and c' may be allotted to the track addresses 30, 60 and 90, respectively.

Next, the original document B is scanned to be read along the lines d and e in the transverse direction to obtain binary signals d' and e'. When scanning is made along the line d in the transverse direction, the MPX code 8 of FIG. 4 is set to actuate only the second magnetic head $4a_2$; that is, the AND gate $10a_2$ of the writing-head selector 1 is opened and the rest of the AND gates remain closed. Therefore, the binary information d' is transferred to the magnetic head $4a_2$ through the AND gate $10a_2$, lines $1a_2$ and $3a_2$. At this time, the position to which the information d' is to be moved is written by the second magnetic head $4a_2$ as d''. This position is selected to be a position which is displaced by a distance 1 in the main scanning direction. In this manner, information d'' is inserted into the frames $A_1$, $A_3$ and $A_5$ as shown in FIG. 5. That is, the information d' which is to be stored in the position $P_8$–$P_9$ (if an address conversion is not made) is removed to the position $P_2$–$P_3$ as shown by the information d''.

With respect to the original document B, when the scanning is being made along the transverse line e, the MPX code of FIG. 4 is set to actuate the third magnetic head $4a_3$ (not shown). That is, only the third AND gate $10a_3$ of the writing-head selector 1 is opened, while the rest of the AND gates remain closed. Thus, the binary signal e' is transferred to the third magnetic head $4a_3$ (not shown) through the AND gate $10a_3$, lines $1a_3$ and $3a_3$ (not shown). The signal e'' is then stored at a predetermined track address on the upper surface of the DK board $5a_2$ (not shown). Specifically, the position to which the information e' is to be moved is written by the magnetic head $4a_3$ and the signal e' is displaced from the position $P_5$–$P_9$ to the position $P_7$–$P_{10}$ so that the information e'' is stored in the DK board $5a_2$ (as will be apparent upon a comparison between the positions of the signals e' and e'').

The signals d'' and e'' may be allotted, for example, to the track addresses 20 and 40 respectively.

Next, the MPX code 8 of FIG. 4 is set to simultaneously select the magnetic heads $4a_1$, $4a_2$ and $4a_3$. That is, the AND gates $11a_1$, $11a_2$ and $11a_3$ of the reading-head selector 2 are simultaneously opened while the rest of the AND gates remain closed. The DK boards $5a_1$ and $5a_2$ are read by the magnetic heads $4a_1$, $4a_2$ and $4a_3$. In this manner, the respective information signals a', d'' and e'' are simultaneously read out by the first, second and third magnetic heads $4a_1$, $4a_2$ and $4a_3$, respectively such that the information $B_1$ and $B_2$ of the original document B is respectively moved into the frames $A_1$ and $A_2$ of the original document A to obtain the f' (see FIG. 5).

In the same manner, the respective information signals b', d'' and e'' are simultaneoulsy read out by the first, second and third magnetic heads $4a_1$, $4a_2$ and $4a_3$ respectively to obtain information g'. Further, the respective information signals c', d'' and e'' are simultaneously read out by the first, second and third magnetic heads $4a_1$, $4a_2$ and $4a_3$, respectively to obtain the information h'. If the information signals f', g' and h' are subsequently outputted onto a picture image producing device, the document C as shown in FIG. 1 is obtained.

As is apparent from the foregoing description, according to the present invention, the steps (3)–(6) can be omitted from the steps (1)–(7) of the first prior art processing method as previously described. In this manner, highspeed picture image posting or moving can be attained. Further, if it is desired to successively change the original documents to be posted or moved on a one by one basis (for example, in the case where the scanned contents i and j of the original document B are to be posted or moved onto the original document A shown in FIG. 1), it will suffice to post or move the scanned information i and j to the regions of the magnetic head $4a_2$ and $4a_3$. Thus, according to the present invention, the processing time has been reduced even when the processing has to be started from the step in which the first original document A is loaded in accordance with conventional techniques.

A second embodiment of the present invention will be described with reference to FIG. 8 in which a mask B is placed on an original document A and information of an original document C is posted or moved to that portion of the document A covered by the mask B to obtain a picture image such as a document C.

Figure 6:
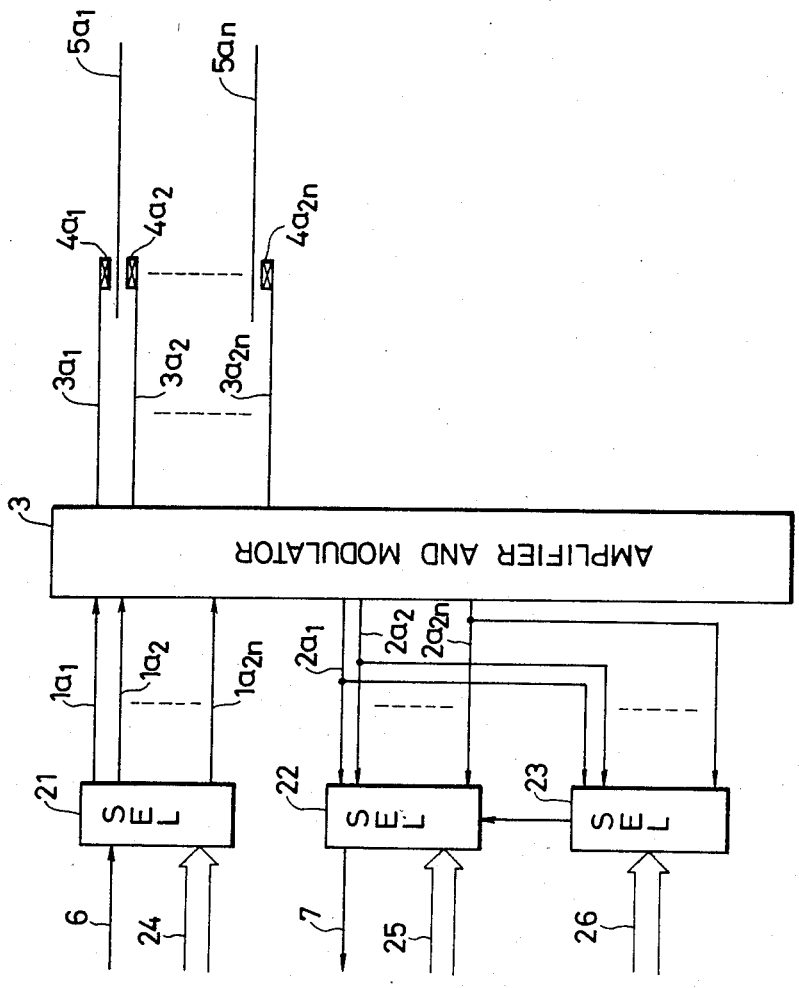
FIG. 6 is a block diagram of a second embodiment of the present invention.

FIG. 6 shows the configuration of the second embodiment. In FIG. 6, reference numerals 21, 22, 23, 24, 25 and 26 represent a writing-head selector, a masking-head selector, a reading-head selector, a first MPX code, a second MPX code and a third MPX code, respectively. Each of the selectors 21–23 is preferably constituted by a MPX device.

Figure 7A:
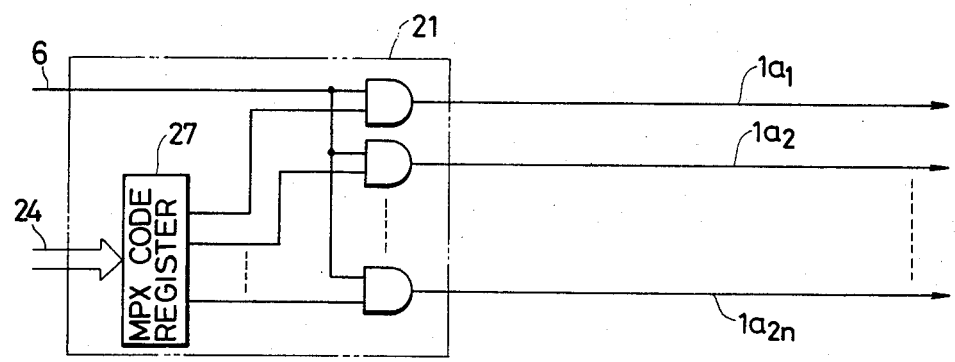
FIG. 7A and FIG. 7B are expanded circuit diagrams of the selectors of FIG. 6.
Figure 7B:
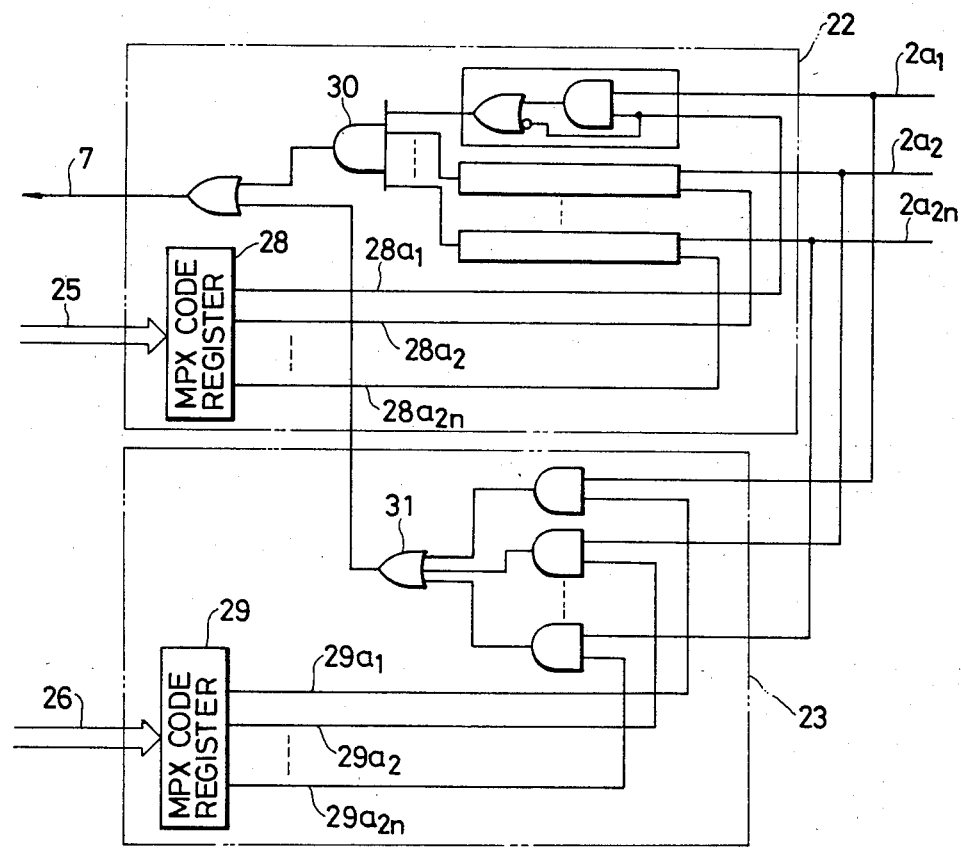

FIGS. 7A and 7B show an embodiment of the configuration of FIG. 6. Reference numerals 27, 28 and 29 represent a first MPX register, a second MPX register and a third MPX register, respectively.

The operation of the second embodiment will be described by referring to FIG. 2 and FIG. 8. FIG. 8 is a time chart of signals read by the picture image reading device of FIG. 2.

The original document A is scanned along the line a to read the original document A. The read-out information is subject to binary transformation to obtain binary signal a' of FIG. 8. At this time, the first MPX code 24 is set to select only the first magnetic head $4a_1$. Therefore, the signal a' is transferred to a DK write-in signal 6 to the writing-head selector 21. The signal a' is then outputted from the writing-head selector 21 through the line $1a_1$. and is applied to a first magnetic head $4a_1$ through the line $3a_1$. The first magnetic head $4a_1$ stores the signal a' in a predetermined region $P_1$-$P_6$ (FIG. 8) on a predetermined track on an upper surface of a DK board $5a_1$.

Figure 8:
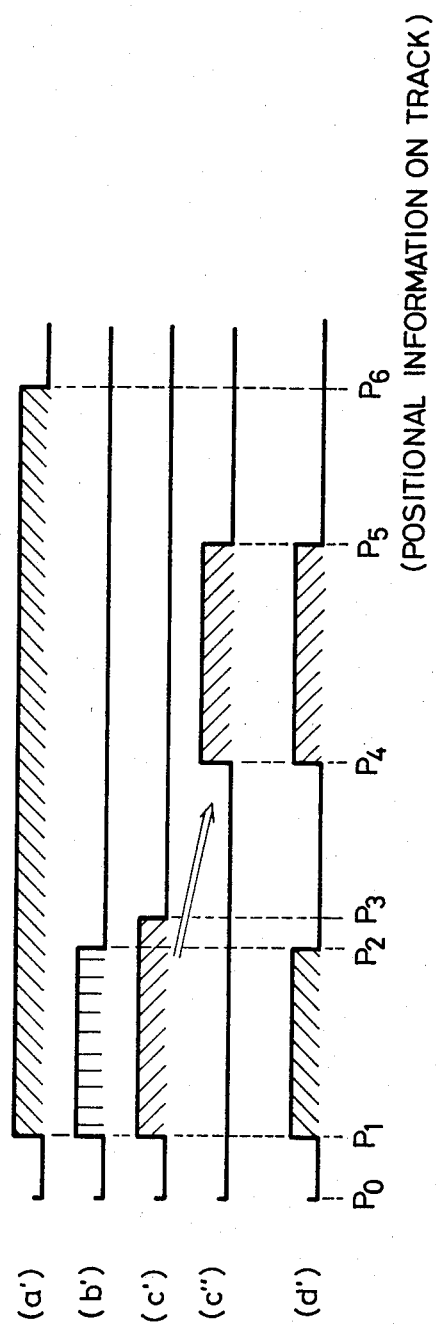
FIG. 8 is a time chart of picture image read-out signals for the second example as in FIG. 2 according to the second embodiment of the invention.

The mask B is read along the line b and the mask information (in which the portion corresponding to the position of the original document A to be recorded is made to be a logical "1") is written by a second magnetic head $4a_2$ on the lower surface of the DK board $5a_1$, as shown in b' of FIG. 8. At this time, a logical "1" signal is stored as the mask information b' at the portion $P_2$-$P_2$ on a predetermined track.

Figure 2:
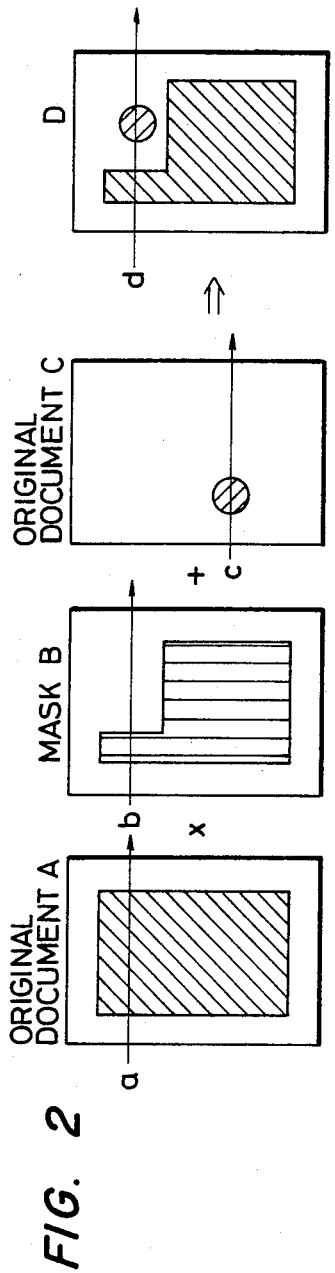
FIG. 2 is a diagram illustrating a second general example of posting processing.

The original document C which contains the information to be posted or moved is read along the line c as shown in FIG. 2. The read-out information c' (FIG. 8) is moved to the position $P_4$-$P_5$ to be recorded by a magnetic head $4a_3$ onto an upper surface of a DK board $5a_2$. Thus, the information c" has been stored in the position $P_4$-$P_5$ on the predetermined track.

Next, the second MPX code 25 is set to simultaneously access the first and second magnetic heads $4a_1$ and $4a_2$ and the third MPX code 26 set to access the third magnetic head $4a_3$. When the second MPX code 25 is set to simultaneously access the magnetic heads $4a_1$ and $4a_2$, each of the signals on the lines $28a_1$ and $28a_2$ connected to MPX code register 28 are at a "1" state, while each of the signals on the remainder lines $28a_c$-$28a_{2n}$ are at a "0" state. When the outputs of both the first and second magnetic heads $4a_1$ and $4a_2$ are "1" (namely, when the signals on both the lines $2a_1$ and $2a_2$ are "1") a logical "1" output is obtained from an AND gate 30. The output of the AND gate 30 is the information of the original document A which is covered by the mask B.

When the third MPX code 26 is set for accessing only the third magnetic head $4a_3$, the signal on the line $29a_3$ connected to the third MPX code register is a logical "1" while the signals on the other lines remain a logical "0". Thus, only the signal read out by the third magnetic head $4a_3$ is outputted from an OR gate 31.

When the magnetic heads $4a_1$, $4a_2$ and $4a_3$ are simultaneously accessed in the manner as mentioned above, a DK read-out signal 7 having a waveform d' of FIG. 8 is outputted from the masking-head selector 22.

If the DK read-out signal 7 is supplied to the picture image output device, the document D of FIG. 2 is obtained, wherein the original document C is posted or moved to the position of the original document A which is covered by the mask B.

In this embodiment, the steps (4')–(8') of the second prior art image processing method can be obtained similarly to that of the first embodiment of the invention. As such, the picture image processing time can be reduced accordingly. This embodiment is preferably used in the case of a so-called compounding description, in which a large character is expressed in terms of a plurality of small characters.

What is claimed is:

1. A method of controlling a plurality of magnetic discs for processing a composite picture image, each disc having a plurality of recording surfaces, each of said surfaces having a plurality of tracks, and each of said tracks has a plurality of of first predetermined positions and second, third, fourth, nth predetermined positions between said first predetermined positions, and wherein said composite picture image comprises a first picture image and a second picture image, inserted into selected portions of said first picture image, said method comprising the steps of:

reading at least a first portion of said first picture image and converting said first read portion of said first picture image into a first picture image digital pulse signal;

storing said pulses of said first picture image digital pulse signal at a first and a second of a plurality of first predetermined positions within a first predetermined track of a first recording surface of a first of said magnetic discs;

reading at least a first portion of said second picture image and converting said read first portion of said second picture image into a second picture image signal; and storing said second picture image signal at a second predetermined position within a first predetermined track of said second recording surface of said first of said magnetic discs;

said second predetermined position being disposed between a first and a second of a plurality of first predetermined positions;

reading out simultaneously said first predetermined tracks of both of said first and second recording surfaces of said first magnetic discs and providing first and second read-out signals, respectively;

combining said first and second read-out signals into a composite read-out signal; and printing said composite picture image in accordance with said composite read-out signal.

2. The method of controlling a plurality of magnetic discs as recited in claim 1, further comprising:

reading second, third, fourth, nth portions of said second picture image and converting said read second, third, fourth, nth portions of said first picture image into a first picture image digital pulse signal; and reading second, third, fourth, nth portions of said second picture image and converting said read second, third, fourth, nth portions of said second picture image into a second picture image signal.

3. The method of controlling a plurality of magnetic discs as recited in claim 2 further comprising:

storing said first picture image signal at a third, a fourth, a fifth, a sixth, a seventh, an eighth, an nth of said plurality of first predetermined positions within said first predetermined track of said first recording surface of said first of said recording discs; and storing said second picture image signal at third, fourth, fifth, etc. predetermined positions within said first predetermined tracks of a first recording surface of a second of said magnetic discs, a second recording surface of said second of said magnetic discs, a first recording surface of a third of said magnetic discs, and on an nth magnetic disc, respectively.

4. The method of controlling a plurality of magnetic discs as recited in claim 2, further comprising:

reading out simultaneously said first predetermined tracks of said first recording surface of said first of said magnetic discs, said second recording surface of said first of said magnetic discs, said first recording surface of said second of said magnetic discs, said second recording surface of said second of said magnetic discs, said first recording side of said third of said magnetic discs, etc. and producing first, second, third, fourth, fifth, nth read-out signals, respectively;

combining said first, second, third, fourth, fifth, nth read-out signals into a composite read-out signal; and printing said composite picture image in accordance with said composite read-out signal.

5. The method of controlling a plurality of magnetic discs as recited in claim 2, wherein said third predetermined position is disposed between said third and said fourth of said first predetermined positions, said fourth predetermined position is disposed between said fifth and sixth of said first predetermined positions, and said fifth predetermined position is disposed between a sixth and a seventh of said first predetermined positions, respectively.

6. A method of controlling a plurality of magnetic discs for processing a composite picture image, wherein each of said discs has first and second recording surfaces, each of said, surfaces has a plurality of tracks, and each of said tracks has a plurality of positions, and wherein said composite picture image comprises a first picture image, a picture mask, and a second picture image, said method comprising the steps of:

reading said first picture image and converting said read first picture image into a first picture image signal;

storing said first picture image signal at least first and second predetermined positions within a first predetermined track of a first recording surface of a first of said magnetic discs;

reading said picture mask and converting said read picture mask into a picture mask signal;

storing said picture mask at predetermined mask positions within said first predetermined track of a second recording surface of said first of said magnetic discs, at least one of said mask positions corresponding to at least one of said first and second predetermined positions;

reading said second picture image and converting said second picture image into a second picture image signal;

storing said second picture image signal at second image predetermined positions other than said predetermined mask positions, said predetermined positions being within said first predetermined track of a first recording surface of a second of said magnetic discs;

reading out both sides of said first of said magnetic discs, and said first recording surface of said second of said magnetic discs to produce first, second and third read-out signals, respectively;

forming a logical AND product between said first and second read-out signals to produce a sub-composite signal;

forming a logical OR product between said sub-composite signal and said third read-out signal to produce a composite signal; and printing said composite picture image in accordance with said composite signal.

7. An apparatus for controlling a plurality of magnetic discs for processing a picture image wherein each of said discs have first and second recording surfaces each of said recording surfaces have a plurality of tracks, and each of said tracks have a plurality of positions therein, said apparatus comprising:

a plurality of magnetic discs;

a plurality of magnetic heads for writing into and reading out signals in a predetermined region of said magnetic discs; wherein, two separate signals are sequentially stored at two separate regions of said magnetic discs and then simultaneously, read out and combined to produce a new composite signal;

multiplexer code means for setting the positional access between said magnetic heads and said magnetic discs; so that a particular magnetic head can be actuated;

writing head selector means for receiving information signals to be written into said magnetic discs;

reading head selector means for transmitting information signals read from said magnetic discs; and multiplex code register means for controlling both of said receiving means and said transmitting means as a function of a received control signal.

8. The apparatus for controlling magnetic discs for processing a picture image as recited in claim 7 wherein said control means comprises a multiplexer code register which receives an access code control signal and activates selected one or ones of said magnetic heads.

9. The apparatus for controlling magnetic discs as recited in claim 8, wherein at least one multiplexer code register is provided to each of said transmitting means and said receiving means, and wherein each of said multiplexer code registers receive different access code control signals.

* * * * *